United States Patent [19]

Yanagishima et al.

[11] Patent Number: 4,555,694

[45] Date of Patent: Nov. 26, 1985

[54] DISPLAY DEVICE FOR A VEHICLE

[75] Inventors: Takayuki Yanagishima, Yokosuka; Yasutoshi Seko, Yokohama, both of Japan

[73] Assignee: Nissan Motor Company, Limited, Yokohama, Japan

[21] Appl. No.: 384,029

[22] Filed: Jun. 1, 1982

[30] Foreign Application Priority Data

Jun. 3, 1981 [JP] Japan .................................. 56-84427

[51] Int. Cl.⁴ ............................................. G08B 25/00
[52] U.S. Cl. .................................. 340/524; 340/525; 340/52 R; 340/286 M; 340/52 F; 340/815.06; 340/815.31; 362/26; 362/31; 40/546; 40/547
[58] Field of Search .................... 340/524, 525, 52 R, 340/286, 815.04, 815.06, 286 R, 286 M, 52 F, 815.3, 815.31, 815.2; 40/546, 547; 362/31, 26, 27, 802

[56] References Cited

U.S. PATENT DOCUMENTS

| 2,623,313 | 12/1952 | Fuchs | 340/815.31 |
| 3,728,673 | 4/1973 | Werda | 340/815.31 |
| 3,824,723 | 7/1974 | Gargas | 340/815.06 |
| 3,906,457 | 9/1975 | Mattedi et al. | 340/815.04 |
| 3,964,302 | 6/1976 | Gordon et al. | 340/525 |
| 4,149,155 | 4/1979 | Kishi et al. | 340/524 |
| 4,234,866 | 11/1980 | Kuroda et al. | 340/52 F |
| 4,287,504 | 9/1981 | Simon et al. | 340/52 F |
| 4,381,505 | 4/1983 | Dion | 340/524 |

FOREIGN PATENT DOCUMENTS 847972  9/1960  United Kingdom ................. 362/27

*Primary Examiner*—Donnie L. Crosland
*Attorney, Agent, or Firm*—Lowe, King, Price & Becker

[57] ABSTRACT

A sensor responsive display device includes a common display section for displaying various messages and/or warnings for a given period of time, and plural individual display sections, each corresponding to one of the messages and/or warnings displayed in the common display section.

16 Claims, 17 Drawing Figures

FIG.13    FIG.14    FIG.15

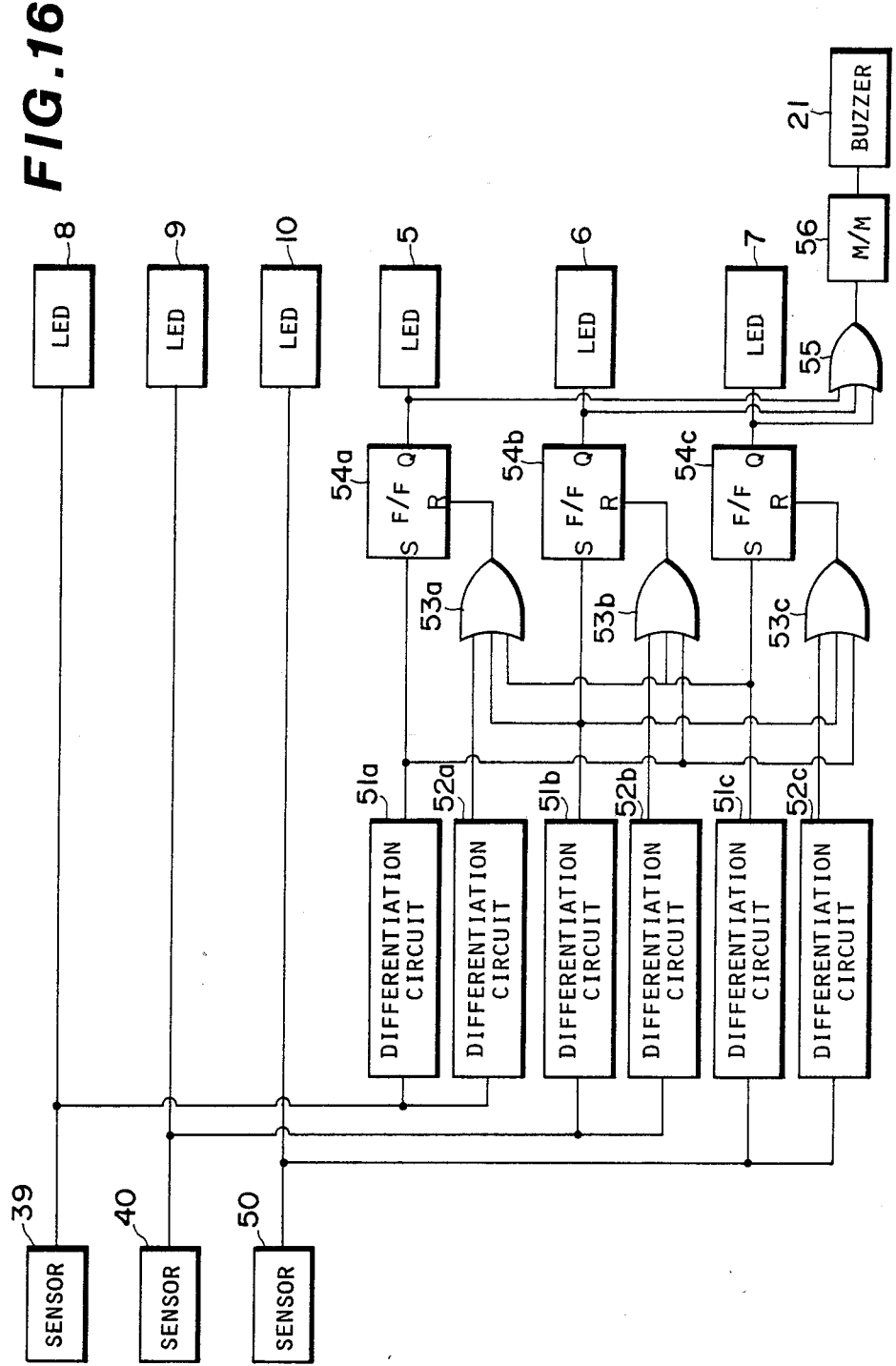

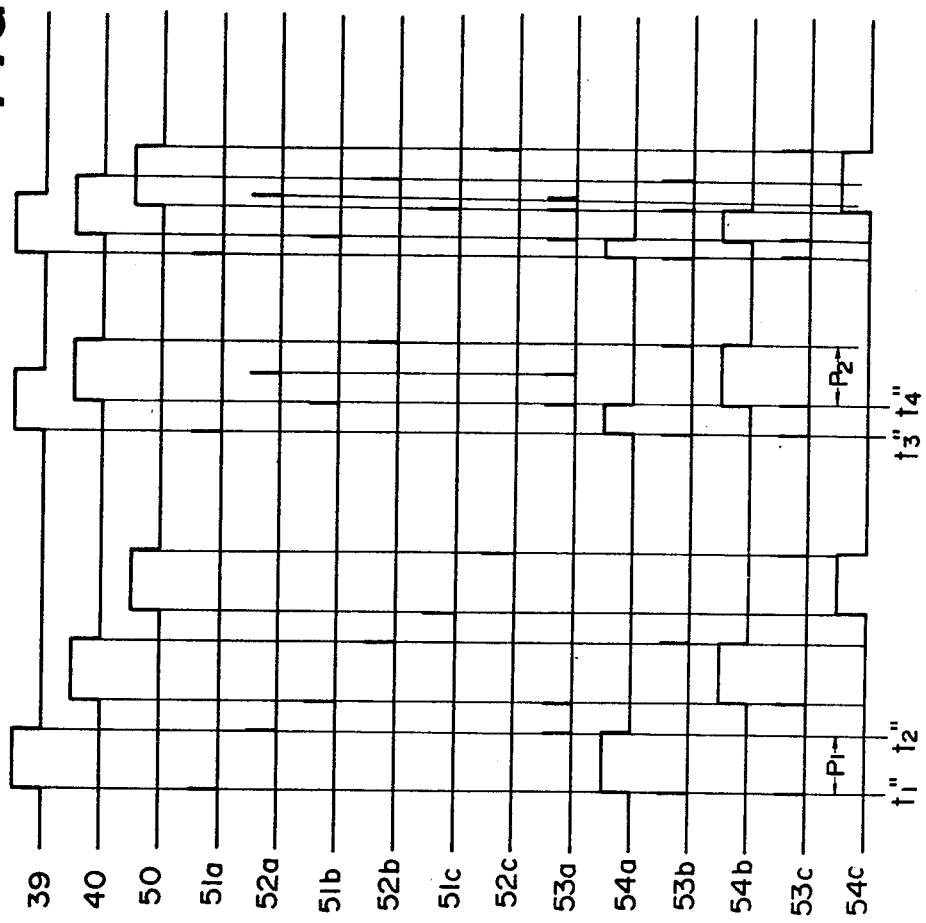

DISPLAY DEVICE FOR A VEHICLE

BACKGROUND OF THE INVENTION

The present invention relates generally to an automotive vehicle display device for displaying information or warnings. More particularly, the invention relates to a single display device capable of displaying a plurality of reports and/or warnings.

Automotive vehicles are usually provided with various visual display devices for informing or warning a driver. Generally, such display devices are provided in an instrument panel near a driver's seat. Since space for the display devices in the instrument panel is seriously limited, the displays of the display devices tend not to be large enough to ensure easy visibility for the driver. For a display device, such as for displaying a recommendation to wear a seat-belt, which is adapted to display the information or warning for a predetermined period of time, the space usually provided is too small to ensure adequate visibility and recognition of the content of the displayed information or warning.

In order to provide a sufficiently large display for the display devices, one approach is to reduce the number of display devices by using a display device capable of displaying a plurality of reports and/or warnings. In this case, the display changes as notable vehicle, traffic, or engine conditions arise. Therefore, if several displayable conditions occur simultaneously or within a substantially short interval, the driver may not have time to recognize all of the displayed information and/or warnings.

SUMMARY OF THE INVENTION

Therefore, it is an object of the present invention to provide a display device with a sufficiently large display area which maintains the display as long as necessary, for adequate legibility.

Another and more specific object of the invention is to provide a device which can display information and/or warnings on a display area large enough for good visibility for a predetermined period and can maintain the display even after the predetermined period expires.

To accomplish the above-mentioned and other objects, there is provided, according to the present invention, a display device which is capable of improving the static visibility of the display and sustaining the display for as long as is required. In the present invention, the display device generally includes a common display section for displaying various information and/or warnings for a given period of time, and a plurality of individual display sections each of which corresponds to an information report and/or warning to be displayed on the common display section.

According to one embodiment of the present invention, the display device comprises a common display including a storage device for a plurality of messages to be displayed and adapted to temporarily display one of the messages for a given period of time in response to the occurrence of a corresponding notable condition, and a plurality of individual displays, each of which is adapted to display one of the plurality of messages, for displaying each of the messages in response to the occurrence of the corresponding condition and maintaining the display for as long as the condition persists.

BRIEF DESCRIPTION OF THE DRAWINGS

The present invention will be understood more fully from the detailed description given herebelow and from the accompanying drawings of the preferred embodiments of the invention, was limitative to the present invention but are for elucidation and explanation only.

In the drawings:

FIGS. 13 to 15 are front elevation views of the display device of FIG. 9 showing respectively the display conditions of time periods $t_1'$, $t_2'$ and $t_3'$ of the timing chart of FIG. 12;

FIG. 16 is a block diagram of the display control circuit according to a modification of the first embodiment as set forth; and FIG. 17 is a timing chart of the display control circuit of FIG. 16.

DESCRIPTION OF THE PREFERRED EMBODIMENT

Figure 1:
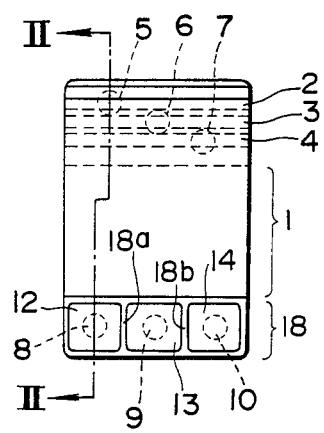
FIG. 1 is a front elevation view of a first embodiment of a display device according to the present invention.
Figure 3:
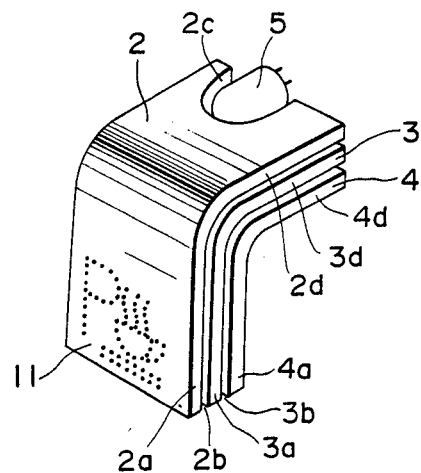
FIG. 3 is a perspective view of the common display section of the display device of FIG. 1.

Referring now to the drawings, particularly to FIGS. 1 and 3, the first embodiment of a display device according to the present invention is provided with two separate display sections, i.e., a common display section 1 and an individual display section 18. The common display section 1 has display area 11 that is larger than the display areas 12, 13 and 14 of the individual display section 18 and is adapted to selectively display any of a plurality of messages or warnings. On the other hand, the individual display areas 12, 13 and 14 are respectively adapted to display specific messages or warnings and the number of the areas corresponds to the number of messages and/or warnings which can be displayed on the common display section 1.

Figure 2:
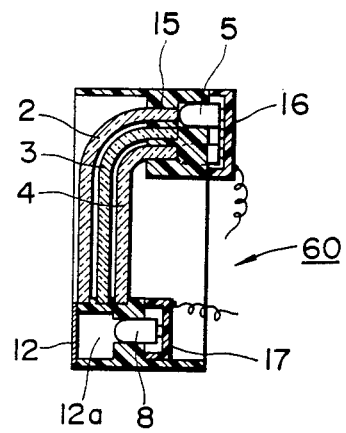
FIG. 2 is a cross sectional view of the display device of FIG. 1 taken along line II—II of FIG. 1.

As shown in FIGS. 1 and 2, the common and individual display sections 1 and 18 are located in a common housing 15. An opaque partition 17 in the common housing 15 separates the two display sections 1 and 18. As shown in FIGS. 2 and 3, the common display section 1 includes bent transparent plates 2, 3 and 4, such as acrylic resin plates, and light sources 5, 6 and 7, such as lamps provided at one end of each of the transparent plates. Each of the transparent plates 2, 3 and 4 has a plurality of small apertures across its vertical surface which in combination form the symbols of messages and/or warnings as shown in FIG. 3. The vertical planes 2a, 3a and 4a of the transparent plates are arranged in parallel and separated from each other in order to define clearances 2b and 3b. The transparent plates 2, 3 and 4 are formed with recesses 2c, 3c and 4c in their horizontal sections 2d, 3d and 4d to receive the light sources 5, 6 and 7, respectively. Each light source 5, 6 and 7 is adapted to emit light to illuminate the symbols in the corresponding transparent plate 2, 3 and 4.

On the other hand, the individual display section 18 is defined below the common display section 1 and the individual display areas 12, 13 and 14 are separated from one another by opaque vertical partitions 18a and 18b. The partitions 18a and 18b define chambers 12a, 13a and 14a in the common housing 15 together with the parition 17. Light sources 8, 9 and 10, such as lamps, are respectively housed in the chambers 12a, 13a and 14a and secured therein, as shown in FIG. 2.

Transparent or semi-transparent plates 12b, 13b and 14b with symbols representing information and/or warnings to be displayed are mounted on the front side of each of the chambers 12a, 13a and 14a respectively. Therefore, the plates 12b, 13b and 14b are adapted to display the corresponding symbols when the corresponding light sources 8, 9 and 10 are illuminated. The symbols on plates 12b, 13b and 14b respectively correspond to those on the plates 2, 3 and 4.

Figure 4:
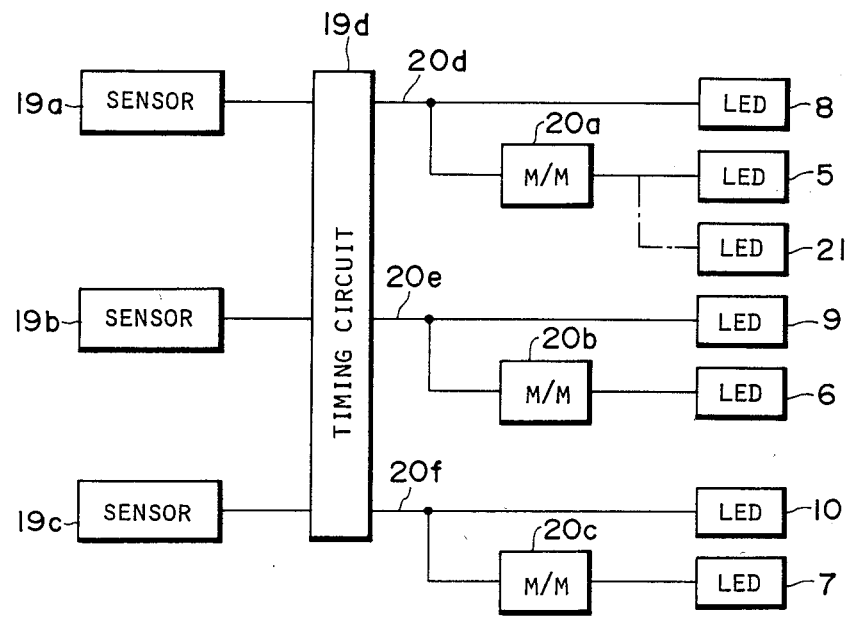
FIG. 4 is a block diagram of a display control circuit for the display device of FIG. 1.

Referring to FIG. 4, a display circuit for controlling illumination of the light sources 5 to 10 includes sensors 19a, 19b and 19c respectively adapted to detect operating conditions corresponding to displayable messages and/or warnings. Each sensor 19a, 19b and 19c produces a sensor signal to be coupled to a timing circuit 19d. The timing circuit 19d controls timing of the coupling of the sensor signals to the light sources 5 to 10 via lines 20d to 20f. In the illustrated embodiment, the light sources 8 and 5 are lit in response to the sensor signal of the sensor 19a. The sensor signal of the sensor 19a is fed to the light source 5 via a monostable multivibrator 20a so that light 5 is lit for a given period of time. Thus, the light source 5 is energized for the period of time during which the monostable multivibrator is triggered. On the other hand, the light source 8 remains lit as long as the sensor 19a derives the sensor signal, as shown in FIG. 5.

Likewise, the light sources 9 and 6 are responsive to the sensor signal of the sensor 19b. The light source 6 is adapted to be lit when a monostable multivibrator 20b is triggered. The light sources 10 and 7 are similarly responsive to the sensor signal of the sensor 19c. The sensor signal is fed to the light source 7 via a monostable multivibrator 20c so that source 7 remains lit a long as the monostable multivibrator 20c is triggered.

It will be appreciated that it is possible to use the sensor signal for other purposes. For example, an audible information-producing device 21 can be connected to the circuit as shown in phantom line.

Figure 5:
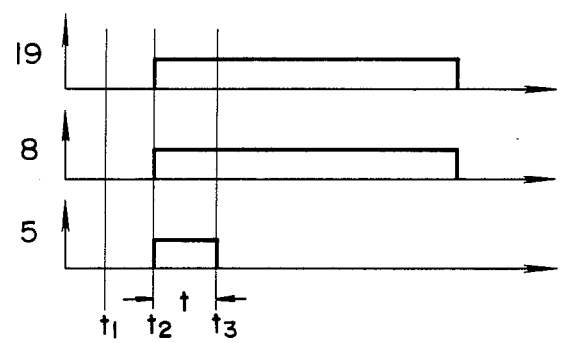
FIG. 5 is a timing chart for the display device of FIG. 1.
Figure 6:
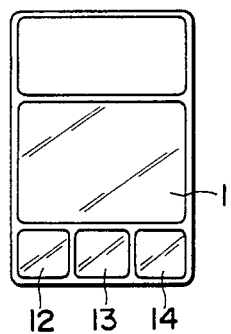
FIGS. 6 to 8 are front elevation views respectively of the display conditions at times $t_1'$, $t_2'$ and $t_3'$ of FIG. 5.
Figure 7:
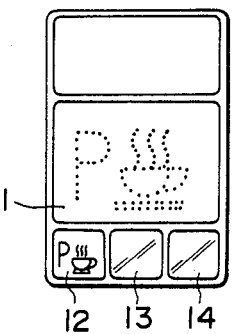
Figure 8:
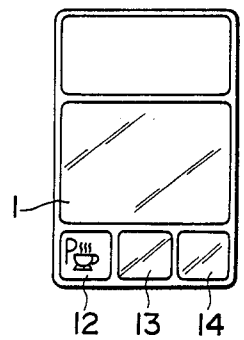

In FIGS. 6, 7 and 8 is shown the appearance of the display at times $t_1$, $t_2$ and $t_3$ of FIG. 5. In this example, the display indicates that the driver should take a rest. Various sensors for judging timing to give such information and indicate that the driver should rest are known. For example, Japanese Utility Model Publication (Jikko.) Sho. No. 48-15104, Japanese Patent First Publication (Tokkai) Sho. No. 51-156878 and Japanese Patent First Publication (Tokkai) Sho. No. 52-13232, and further co-pending Japanese Patent Application Sho. No. 56-84425 filed June 3, 1981 include examples of systems adapted to give the driver suggestions for taking a rest.

As illustrated in FIG. 6, at time $t_1$, the sensor 19a for detecting the driver's state of awareness is not producing the sensor signal. Therefore, no light sources are lit. In response to the sensor signal produced at time $t_2$, both light sources 8 and 5 are turned on to emit light so that both display areas 1 and 12 are lit as shown in FIG. 7. Thereafter, the monostable multivibrator 20a turns off at time $t_3$ when the predetermined trigger period expires. Thus, the light source 5 is turned off but light source 8 remains on, as shown in FIG. 8.

Figure 9:
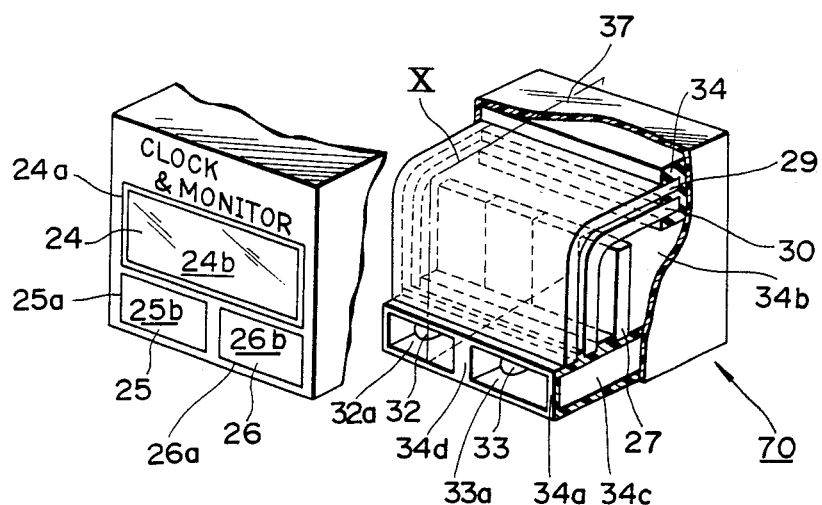
FIG. 9 is an exploded perspective view of a second embodiment of the display device according to the present invention.
Figure 10:
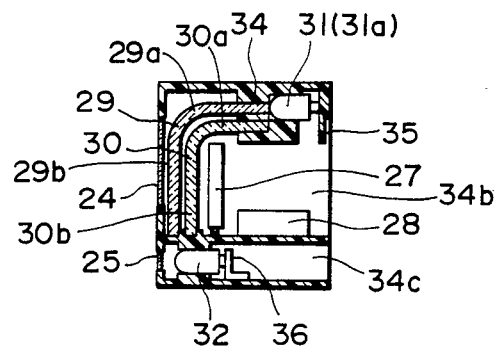
FIG. 10 is a cross sectional view of the display device of FIG. 9 taken along plane X in FIG. 9.

FIGS. 9 to 12 are illustrations of a second embodiment of the automotive display device according to the present invention. In this embodiment, the display device incorporates a digital automotive clock comprising a well-known clock mechanism 28 and a digital clock display panel 27. The clock mechanism 28 and the digital clock display panel 27 are fixedly mounted on a horizontal partition 34a of a housing 34, which partition 34a divides the interior of the housing into upper and lower chambers 34b and 34c, as shown in FIGS. 9 and 10. A pair of transparent or semi-transparent plates 29 and 30 are housed in the upper chamber 34b. The plates 29 and 30 are bent to define horizontal sections 29a and 30a and vertical sections 29b and 30b respectively. Similarly to the foregoing embodiment, the vertical section 29b and 30b of the plates 29 and 30 have a plurality of small apertures which in combination form symbols representative of information and/or warnings to be displayed. The plates 29 and 30 are placed so that the vertical sections 29b and 30b are positioned in front of the digital clock display panel 27, and are parallel to each other with some clearance in between.

Light sources 31 and 31a are provided near the top of the upper chamber 34b, at the ends of the horizontal sections 29a and 30a respectively. Light sources 32 and 33 are respectively mounted in compartments 32a and 33a, located in the lower chamber 34c and spaced from each other by an opaque partition 34d.

The housing 34 has openings 24a, 25a and 26a to which semi-transparent plates 24b, 25b and 26b are secured. Plate 24b serves as a screen for the common display section 24, while the plates 25b and 26b serve as display screens of the individual display sections 25 and 26. On the plates 25b and 26b, images corresponding to information and/or warnings to be displayed on the common display section 24 are inscribed in a manner that can be seen by the driver only when the light sources 32 and 33 emit light.

Figure 11:
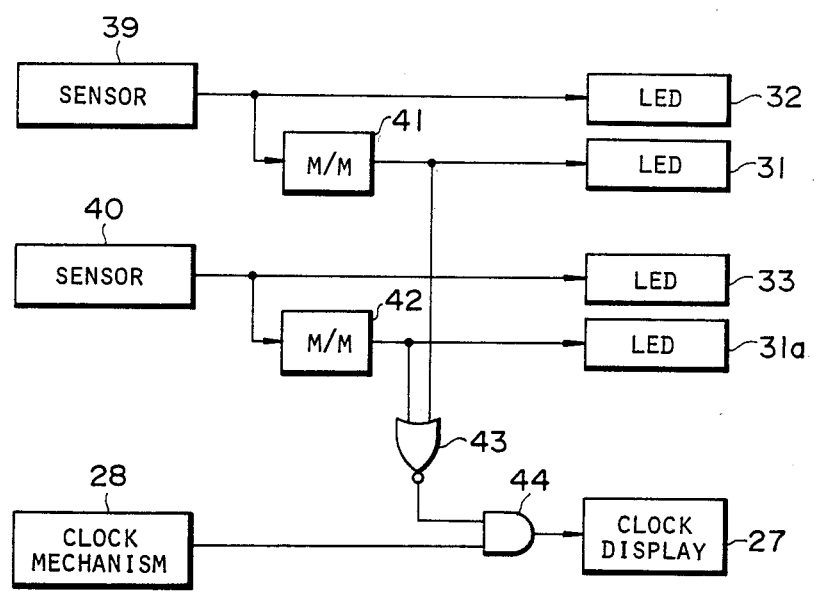
FIG. 11 is a block diagram of the display control circuit of the display device of FIG. 9.

Referring to FIG. 11, a display circuit for controlling the display device of FIGS. 9 and 10 is illustrated. As opposed to the foregoing first embodiment, sensors 39 and 40 are directly connected to the light sources 32 and 33. Sensors 39 and 40 are also respectively connected to the light sources 31 and 31a via monostable multivibrators 41 and 42. The monostable multivibrators 41 and 42 are activated to a first state for a predetermined period in response to the sensor signal from the sensors 39 and 40. While multivibrators 41 and 42 are respectively in the first state, the light sources 31 and 31a emit light.

State indicating output signals of monostable multivibrators 41 and 42 are connected to a NOR gate 43, having an output terminal connected to one input of an AND gate 44, having a second input connected to a time indicating output of clock mechanism 28. AND gate 44 has an output terminal connected to digital clock display panel 27. Therefore, the AND gate 44 couples the signal from the clock mechanism to display panel 27 only as long as the outputs of the monostable multivibrators are absent.

Figure 12:
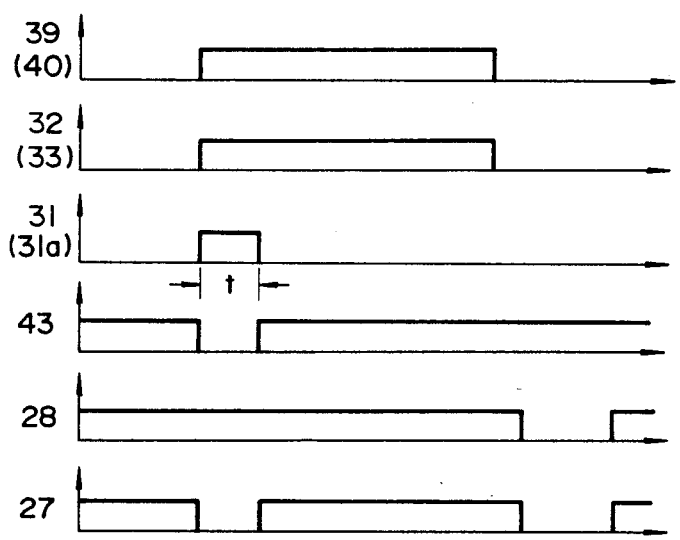
FIG. 12 is a timing chart for the operation of the display device illustrated in FIG. 9.
Figure 12:
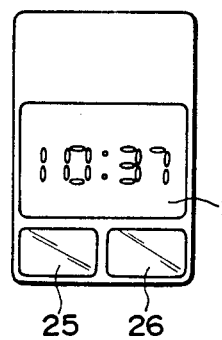
Figure 12:
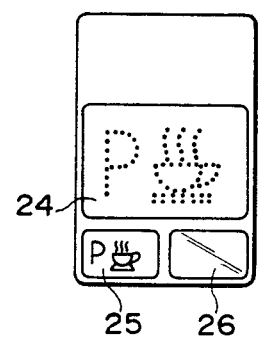
Figure 12:
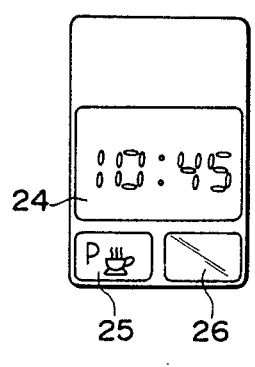

Operation of the display circuit as set forth is explained with reference to FIGS. 12 to 15. FIG. 12 is a timing chart for the display circuit; in FIGS. 13 to 15 are shown states of the display in the display device. When no signals are derived by sensors 39 and 40, the light sources 32, 33, 31 and 31a are not turned on, as a matter of course. In this case, the NOR gate supplies a high-level output to the AND gate 44. In addition, the clock mechanism 28 continuously produces the signal to enable AND gate 44 so the output signal of the clock mechanism 28 is coupled to the clock display 27. Therefore, as shown in FIG. 13, the time indicating output of clock 28 is displayed at common display section 24 while individual display sections 25 and 26 are dark. Now assume the sensor 39 produces a sensor signal at time t4, causing monostable multivibrator 41 to turn on in response thereto. Accordingly, the light sources 32 and 31 emit light to accent the information or warning provided on the plates 29 and 25b, whereby common display section 24 and individual display section 25 are simultaneously illuminated with visual warnings to the driver. At the same time, the monostable multivibrator output is fed to the NOR gate 43 to disable the AND gate 44 so that time is no longer indicated on display section 24. Therefore, the display device displays the corresponding information or warning both on common display section 24 and individual display section 25, as shown in FIG. 14. When the predetermined period T expires, the monostable multivibrator 42 turns off the light source 31 and the NOR gate 43 again derives the high-level output to enable the AND gate 44 so the time indicating output of clock 28 is again coupled to display 27. On the other hand, since the light source 32 remains on as long as the sensor produces the sensor signal, the display on the plate 25b is maintained. Thus, as shown in FIG. 15, the common display section 24 displays the digital time indication and the individual display section 25 displays the information based on the sensor signal, whereby section 25 continues to provide the visual warning until sensor 39 is no longer sensing the phenomenon which caused it to be activated.

FIG. 16 is a circuit diagram of a modification of the first embodiment of FIG. 1. In this modification the display in the common display section 1 is changed whenever a new sensor signal is received. In FIG. 16, the sensors 39, 40 and 50 are substantially the same as the aforementioned sensors 19a, 19b and 19c of FIG. 4. As in the first embodiment, the sensors 39, 40 and 50 are respectively connected to the light sources 8, 9 and 10 of the individual sections 12, 13 and 14. Therefore, the light sources 8, 9 and 10 emit light whenever the corresponding sensor 39, 40 and 50 produces the sensor signal.

The sensors 39, 40 and 50 are also respectively connected to differentiation circuits $51_a$, $51_b$, $51_c$ and $52_a$, $52_b$, $52_c$. The differentiation circuits $51_a$, $51_b$ and $51_c$ are responsive to the leading edges of the sensor signals to produce outputs. On the other hand, the differentiation circuits $52_a$, $52_b$ and $52_c$ are responsive to the trailing edges of the sensor signals to produce outputs. Differentiation circuit $51_a$ derives an output signal that is coupled to a set terminal S of a flip-flop $54_a$, having a Q-output terminal which is in turn connected to the light source 5. Likewise, output signals of differentiation circuits $51_b$ and $51_c$ are respectively coupled to set terminals S of flip-flops $54_b$ and $54_c$, having Q-output terminals which are, in turn, connected to the light sources 6 and 7.

Reset terminals of the flip-flops $54_a$, $54_b$, and $54_c$ are respectively connected to output terminals of OR gates $53_a$, $53_b$ and $53_c$. OR gate $53_a$ has input terminals responsive to output signals of the differentiation circuits $52_a$, $51_b$ and $51_c$. Likewise, input terminals of the OR gates $53_b$ and $53_c$ are respectively connected to output terminals of differentiation circuits $51_a$, $52_b$, $51_c$ and $51_a$, $51_b$, $52_c$. Therefore, the flip-flops $54_a$, $54_b$ and $54_c$ are all connected to input terminals of an OR gate 55 in a buzzer circuit. The OR gate 55 output signal is coupled to a monostable multivibrator 56 to trigger the latter. The output of the monostable multivibrator 56 is connected to a buzzer device to actuate the latter, causing it to produce an audible buzzer sound for a predetermined period of time.

The operation of the circuit of FIG. 17 is explained herebelow with reference to FIG. 17. At a time $t_1''$, the sensor 39 is assumed to produce a sensor signal. In response to the sensor signal of the sensor 39, the differentiation circuit $51_a$ produces an output to set the flip-flop $54_a$. Therefore, at time $t_1''$, the light sources 8 and 5 are both turned on. Assuming the sensor signal of the sensor 39 remains on for a period $P_1$, the light source 8 also remains on for a period $P_1$. At the same time, the output of the differentiation circuit $51_a$ is supplied to the OR gates $53_b$ and $53_c$, which respond to the differentiation circuit output to reset the flip-flops $54_b$ and $54_c$. When the sensor signal of the sensor 39 stops at time $t_2''$ at the end of the period $P_1$, the flip-flop $54_a$ is reset via OR gate $53_a$ so that light sources 5 and 8 are extinguished.

Now assume that the second sensor derives a sensor signal before the first sensor signal stops. For example, assume that the sensor 39 produces the sensor signal at time $t_3''$ and the sensor 40 produces the sensor signal at time $t_4''$, which is before the sensor signal of the sensor 39 stops. Under these conditions, light source 8 emits light at time $t_3''$ and the light source 9 emits light at time $t_4''$. In addition, the output signal of differentiation circuit $51_a$ is coupled at time $t_3''$ to the light source 5 via the flip-flop $54_a$ and to the OR gates $53_b$ and $53_c$ which derive output pulses that respectively reset the flip-flops $54_b$ and $54_c$. At time $t_4''$, the sensor 40 also produces an output signal that causes an output of the OR gate $53_a$ to be produced and supplied as a reset input to the flip-flop $54_a$. At the same time, the output of the differentiation circuit $51_b$ is fed to the flip-flop $54_b''$ to set the latter. Therefore, the light source 6 emits light and light source 5 is turned off. After period $P_2$ has elapsed the sensor 40 stops producing its sensor signal. In response to the trailing edge of the sensor signal, the output signal of differentiation circuit $52_b$ is coupled to the OR gate $53_b$, so that the flip-flop $54_b$ is reset.

Additionally, the outputs of the flip-flops $54_a$, $54_b$ and $54_c$ are coupled to the OR gate 55 of the buzzer circuit. Therefore, at times $t_1''$, $t_3''$ and $t_4''$, the OR gate 55 produces an output signal to turn on the monostable multivibrator 56 for the predetermined period to actuate the buzzer device 21.

As explained hereabove, the present invention fulfulls all of the objects sought therefor.

While the invention has been illustrated in detail in the specific embodiment forr embodying the present invention, it should not be considered that the invention is limited to the specific embodiments but can be embodied otherwise without departing from the principle of the invention.

What is claimed is:

1. An automotive vehicle display device for displaying various information according to vehicle driving conditions, comprising:

detector means for detecting driving and/or driver conditions for deriving plural detector signals in response to preselected vehicle driving and/or driver conditions being detected;

a common display for displaying various visual patterns, each corresponding to one of the conditions to be displayed, said common display including a storage for storing said display patterns;

a plurality of individual displays, each displaying one of said display patterns indicative of a corresponding one of said conditions; and a display controller associated with said common and individual displays for controlling displays thereon, said common display, and one of the display patterns corresponding to the detected notable condition for a predetermined period of time; and said controller operating one of said individual displays to display specific information concerning said notable condition in response to said detector signal as long as the preselected vehicle driving condition is maintained.

2. The display device as set forth in claim 1, wherein said common display comprises a plurality of superimposed transparent plates, each of which has a display image corresponding to one of said conditions, and a plurality of light sources, each of which is adapted to emit light through one of said plates to illuminate the display image in the corresponding plate.

3. The device as set forth in claim 1 or 2, wherein said common display has a display area greater than that of each of said individual displays, said display area of said common display being large enough to be noticeable and legible.

4. The device as set forth in claim 3, wherein said common display includes: a digital clock, and means for displaying a time indication of the digital clock on the common display while other messages of the common display are not being displayed.

5. A display device applicable for an automotive vehicle to display driving messages and/or warnings, comprising:

a plurality of first superimposed transparent members each of which is formed with a plurality of apertures which in combination constitute an image representative of information to be displayed;

first light sources, each of which is positioned to emit light through one of said transparent members, each of said light sources being responsive to the occurrence of one of preselected vehicle driving conditions and remaining on for a given period of time when activated;

a plurality of second transparent members, each of which has an image corresponding to one of the images of said first transparent members, the images of the second transparent members being mutually spaced from each other; and second light sources, each of which is positioned to emit light through one of said second transparent members and is adapted to emit light as long as the corresponding notable condition persists.

6. A display device as set forth in claim 5, wherein each of said first light sources is associated with a time setting circuit which defines said given period for which said first light sources remain on.

7. A display device as set forth in claim 5, wherein said first transparent members comprises a common display including a digital clock system, said first light sources being associated with said digital clock system so that an image derived from said digital clock system is normally applied to said common display and is decoupled from said common display while any of first light sources emits light.

8. A display device as set forth in claim 5, wherein said first light sources are interrelated so that a previously-activated light source responsive to one notable condition is deactivated in response to any other of said notable conditions being derived.

9. A system for visually signalling vehicle drivers comprising sensor means for deriving a plurality of information signals, a display including a common display area and plural individual display areas, one individual display area being provided for each of the signals, each individual display area including means for providing a different image in a different space to the driver for each signal, the common display area including means for providing a different image in the same space to the driver for each signal, and means responsive to the signals for activating the common display area and one of the individual display areas so that the individual display area associated with one of said signals provides the driver with an image indicative of the information associated with said one signal after the image indicative of the information associated with said one signal is no longer provided to the driver by the common display.

10. The system of claim 9 wherein the means for activating includes means for enabling the common display to provide the driver with the information associated with said one signal for only a predetermined interval.

11. The system of claim 10 wherein the means for activating includes means for enabling each individual display to provide the driver with the information associated with said one signal for a predetermined duration that overlaps with and extends considerably beyond the predetermined interval.

12. The system of claim 10 further including a clock source, means for normally coupling a time indication image derived in response to the clock source to the common display area and for replacing the time indication on the common display with the information associated with said one signal for the predetermined interval in response to said one signal being derived.

13. The system of claim 9 wherein the means for activating includes means responsive to derivation of a second of said signals for replacing the information associated with said one signal on the common display with information associated with the second of the signals without affecting the displayed information associated with said first signal on the individual display area provided for the first signal.

14. The system of claim 9 wherein the common display area includes plural superimposed fixed image representations, one for the information in each signal, an optical arrangement for separately illuminating each fixed image representation, the optical arrangement for each fixed image representation responsive to one of the signals so that the fixed image representation associated with the information of each signal is provided to the driver in response to derivation of the associated signal.

15. The system of claim 14 wherein each image representation is formed on a different translucent member, and the optical arrangement includes a different light source positioned at an edge of each translucent member for transmitting light through the member and causing the image on the member to be projected to the driver.

16. The system of claim 9 wherein the means for activating includes means for enabling plural individual areas to simultaneously provide the driver with images of the information associated with a plurality of said signals.

* * * * *